(12) United States Patent
Hassell (10) Patent No.: US 9,061,693 B2
(45) Date of Patent: Jun. 23, 2015

(54) BAKERY DOLLY

(75) Inventor: Jon P. Hassell, Atlanta, GA (US)

(73) Assignee: Rehrig Pacific Company, Los Angeles, CA (US)

( * ) Notice: Subject to any disclaimer, the term of this patent is extended or adjusted under 35 U.S.C. 154(b) by 0 days.

(21) Appl. No.: 13/215,153

(22) Filed: Aug. 22, 2011

(65) Prior Publication Data

US 2012/0043731 A1 Feb. 23, 2012

Related U.S. Application Data

(60) Provisional application No. 61/376,227, filed on Aug. 23, 2010.

(51) Int. Cl.
| | | |
|---|---|---|
| *B65D 19/02* | (2006.01) | |
| *B65D 19/38* | (2006.01) | |
| *B62B 5/00* | (2006.01) | |
| *B62B 3/16* | (2006.01) | |
| *B62B 3/00* | (2006.01) | |

(52) U.S. Cl.
CPC .......... *B62B 5/0093* (2013.01); *B62B 2202/12* (2013.01); *B62B 3/16* (2013.01); *B62B 3/006* (2013.01)

(58) Field of Classification Search
USPC ........ 280/33.998, 79.11, 79.4, 87.01, 87.021; 206/504, 505, 509; 108/53.1, 53.3
See application file for complete search history.

(56) References Cited

U.S. PATENT DOCUMENTS

| | | | | |
|---|---|---|---|---|
| 5,445,396 | A * | 8/1995 | Sebor | 280/33.998 |
| 6,607,199 | B2 * | 8/2003 | Gruber | 280/33.991 |
| 6,886,787 | B2 * | 5/2005 | Stahl | 248/129 |
| 6,893,032 | B2 * | 5/2005 | Kershaw | 280/79.5 |
| 7,066,477 | B2 | 6/2006 | Dubois et al. | |
| 2002/0153682 | A1 | 10/2002 | Gruber | |
| 2003/0213878 | A1 | 11/2003 | Stahl | |
| 2005/0006861 | A1* | 1/2005 | Dubois et al. | 280/33.998 |

FOREIGN PATENT DOCUMENTS

| | | |
|---|---|---|
| GB | 2263684 | 8/1993 |
| GB | 2353012 | 2/2001 |

OTHER PUBLICATIONS

European Search Report for European Patent Application No. 11178542.4, mailed Jan. 19, 2015.

* cited by examiner

*Primary Examiner* — Jeffrey J Restifo
*Assistant Examiner* — Erez Gurari
(74) *Attorney, Agent, or Firm* — Carlson, Gaskey & Olds (57) ABSTRACT

A dolly includes a deck having a support surface and a plurality of wheels below the deck. The deck includes a peripheral lip around a periphery of the deck, the peripheral lip including an inner wall portion spaced inwardly from an outer wall portion. The inner wall portion and outer wall portion are joined continuously at an upper edge thereof.

14 Claims, 16 Drawing Sheets

BAKERY DOLLY

This application claims priority to U.S. Provisional Application Ser. No. 61/376,227, filed Aug. 23, 2010.

BACKGROUND

A dolly for bakery trays typically includes a deck supported by casters. A stack of bakery trays can be supported on the dolly for moving the bakery trays.

Some types of bakery trays include a base with side walls and front and rear walls extending upwardly from a periphery of the base. The front and rear walls are shorter than the side walls. Stacking feet protrude outwardly from the side walls. The stacking feet may provide multiple stacking heights for the trays when they are stacked in different relative orientations.

SUMMARY

A dolly according to example embodiments of the present invention includes a deck having a support surface and a plurality of wheels below the deck. The deck includes a peripheral lip around a periphery of the deck, the peripheral lip including an inner wall portion spaced inwardly from an outer wall portion. The inner wall portion and outer wall portion are joined continuously at an upper edge thereof.

In one option, there are recesses formed in end portions of the peripheral lip. The recesses receive the stacking feet of the tray. The stacking feet of the tray can slide on the peripheral lip during stacking until the stacking feet drop into the recesses, and the stacking feet can slide on the peripheral lip during unstacking.

In one embodiment, the recesses are formed only in the inner portion of the peripheral lip. In another embodiment, the recesses are formed through both the inner portion and the outer portion of the peripheral lip.

The dolly may also include reinforcement channels formed in the support surface. A recess may be formed outwardly of the support area.

DETAILED DESCRIPTION OF THE PREFERRED EMBODIMENTS

A dolly 10 for bakery trays according to a first embodiment of the present invention is shown in FIGS. 1-7. The dolly 10 includes a deck having a central support surface 12 circumscribing a central opening 14. The deck includes a plurality of reinforcement channels including end reinforcement channels 16 having ribs 17 extending therethrough and side reinforcement channels 18 having ribs 19 extending therethrough. The central support surface 12 of the deck further includes outer side reinforcement channels 20 having ribs 21 therethrough. Each end of the dolly 10 includes a recessed area 22 outward of the central support surface 12. Reinforcement channels 24 are formed in the recessed areas 22 and include perpendicular ribs 25 therethrough.

Figure 1:
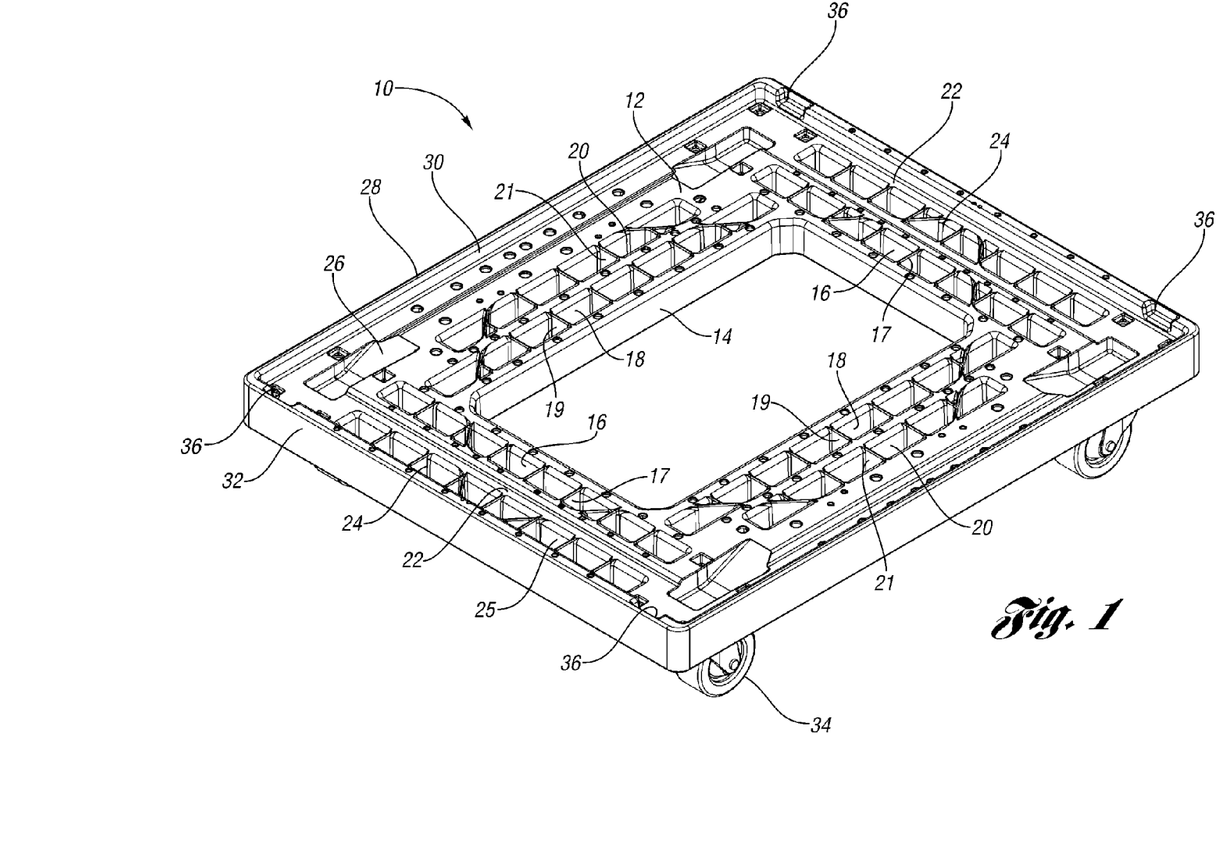
FIG. 1 is a perspective view of a dolly according to a first embodiment of the present invention.

Caster-receiving pockets 26 are formed adjacent corners of the dolly 10 through the central support surface 12 and recessed areas 22. The caster-receiving pockets 26 are aligned with casters 34 extending downward from an under side of the dolly 10.

A peripheral lip 28 extends around the periphery of the dolly 10. The peripheral lip 28 includes an inner wall portion 30 spaced inwardly from an outer wall portion 32. The inner wall portion 30 and the outer wall portion 32 are joined continuously at an upper edge thereof. The double-walled peripheral lip 28 provides increased strength and durability to the dolly 10. The double-walled peripheral lip 28 provides increased stiffness to the deck. Recesses 36 are formed in end portions of the peripheral lip 28. The recesses 56 in this embodiment are formed through the inner wall portion 30 of the peripheral lip 28 but not through the outer wall portion 32 of the peripheral lip 28.

Figure 2:
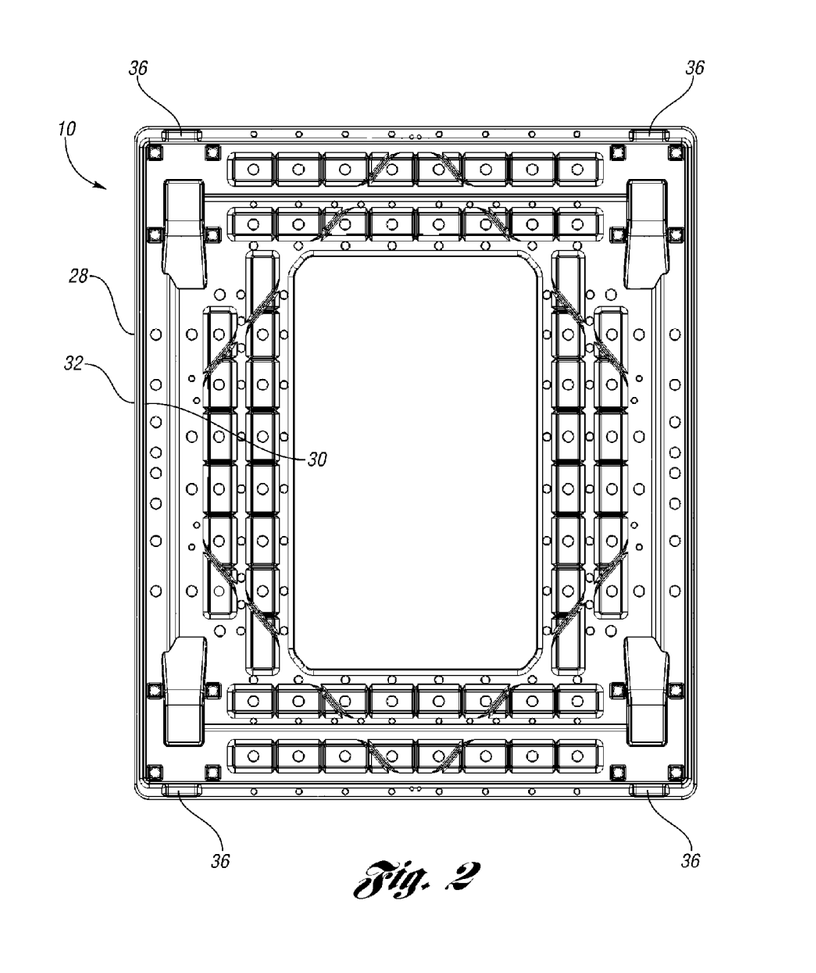
FIG. 2 is a top view of the dolly of FIG. 1.
Figure 3:
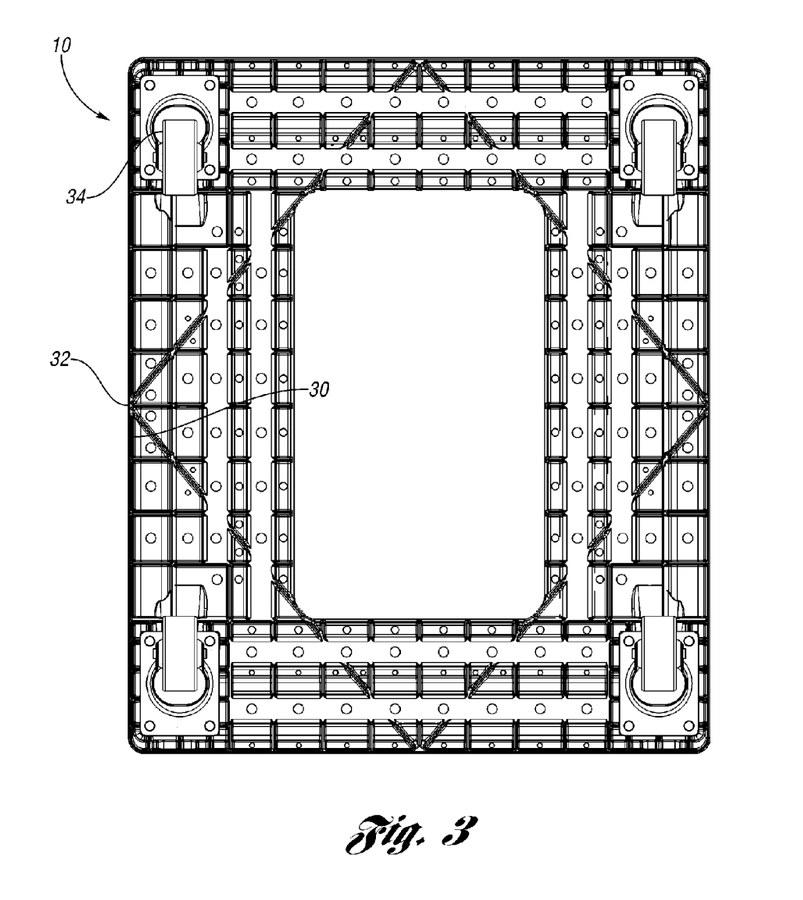
FIG. 3 is a bottom view of the dolly of FIG. 1.

FIG. 2 is top view of the dolly 10 and FIG. 3 is a bottom view of the dolly 10. As shown, the inner wall portion 30 of the peripheral lip 28 is spaced inwardly of the outer wall portion 32.

Figure 4:
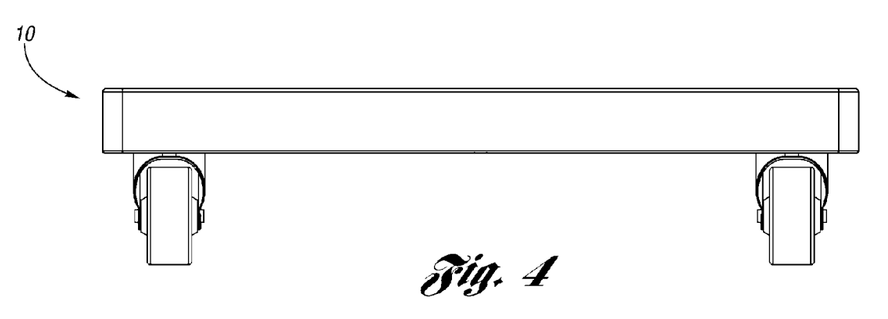
FIG. 4 is an end view of the dolly of FIG. 1.
Figure 5:
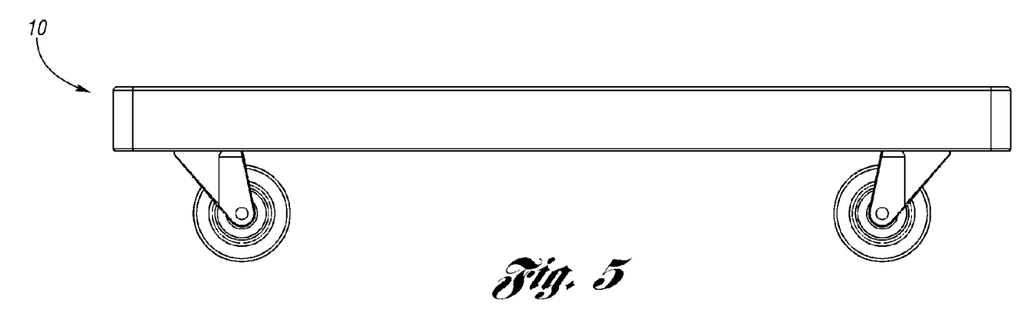
FIG. 5 is a side view of the dolly of FIG. 1.
Figure 5A:
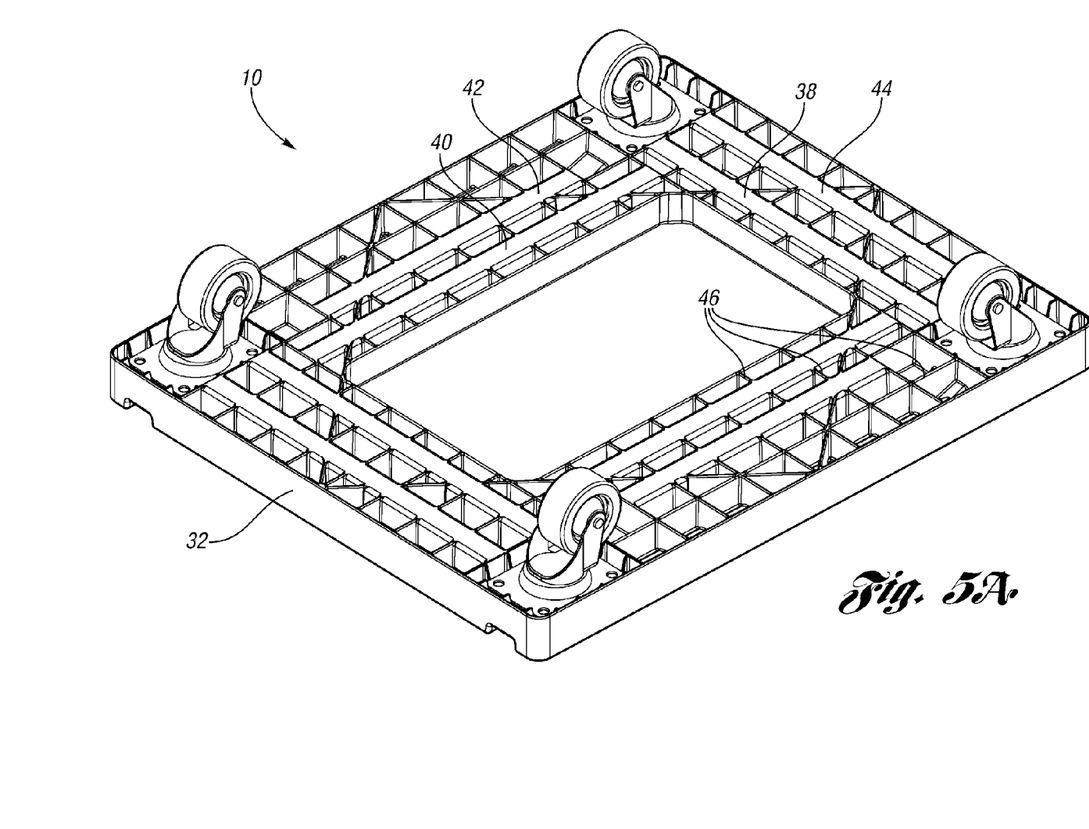
FIG. 5A is a bottom perspective view of the dolly of FIG. 1.

FIG. 4 is an end view of the dolly 10. FIG. 5 is a side view of the dolly 10. FIG. 5A is a bottom perspective view of the dolly 10. As shown, the channels 16, 18, 20, 22 formed in the upper surface (FIG. 1) are partially defined by at their lower end by lower panels 38, 40, 42, 44, respectively. Ribs 46 support the upper horizontal panels and surfaces (FIG. 1) of the deck of the dolly 10.

Figure 6:
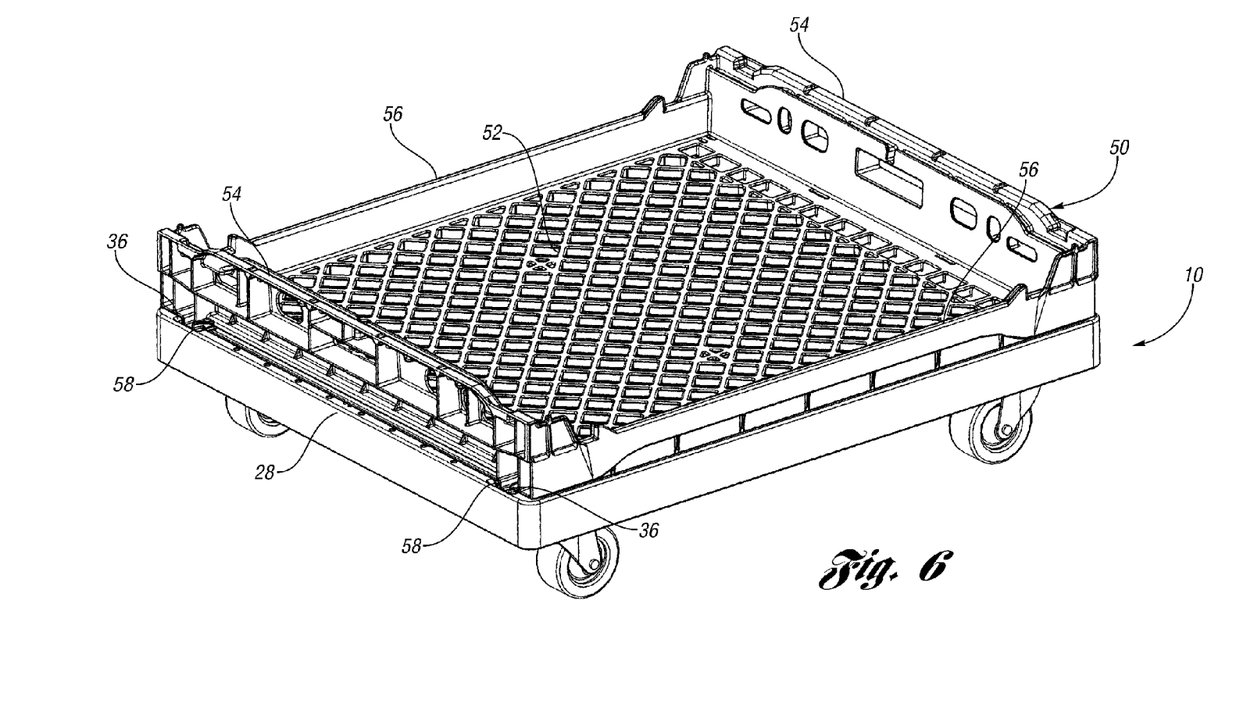
FIG. 6 shows the dolly of FIG. 1 with a first tray stacked thereon.

As shown in FIG. 6, a first tray 50 can be received on the dolly 10. The first tray 50 includes a base 52 and side walls 54 extending upwardly from side edges of the base 52. Front and rear walls 56 extend upward from front and rear edges of the base 52. The side walls 54 are taller than the front and rear walls 56. Stacking feet 58 protrude outwardly from the side walls 54. When the first tray 50 is stacked on the dolly 10, the feet 58 are received in the recesses 36 in the peripheral lip 28 of the dolly 10. Additional first trays 50 can be stacked on the first tray 50.

Figure 7:
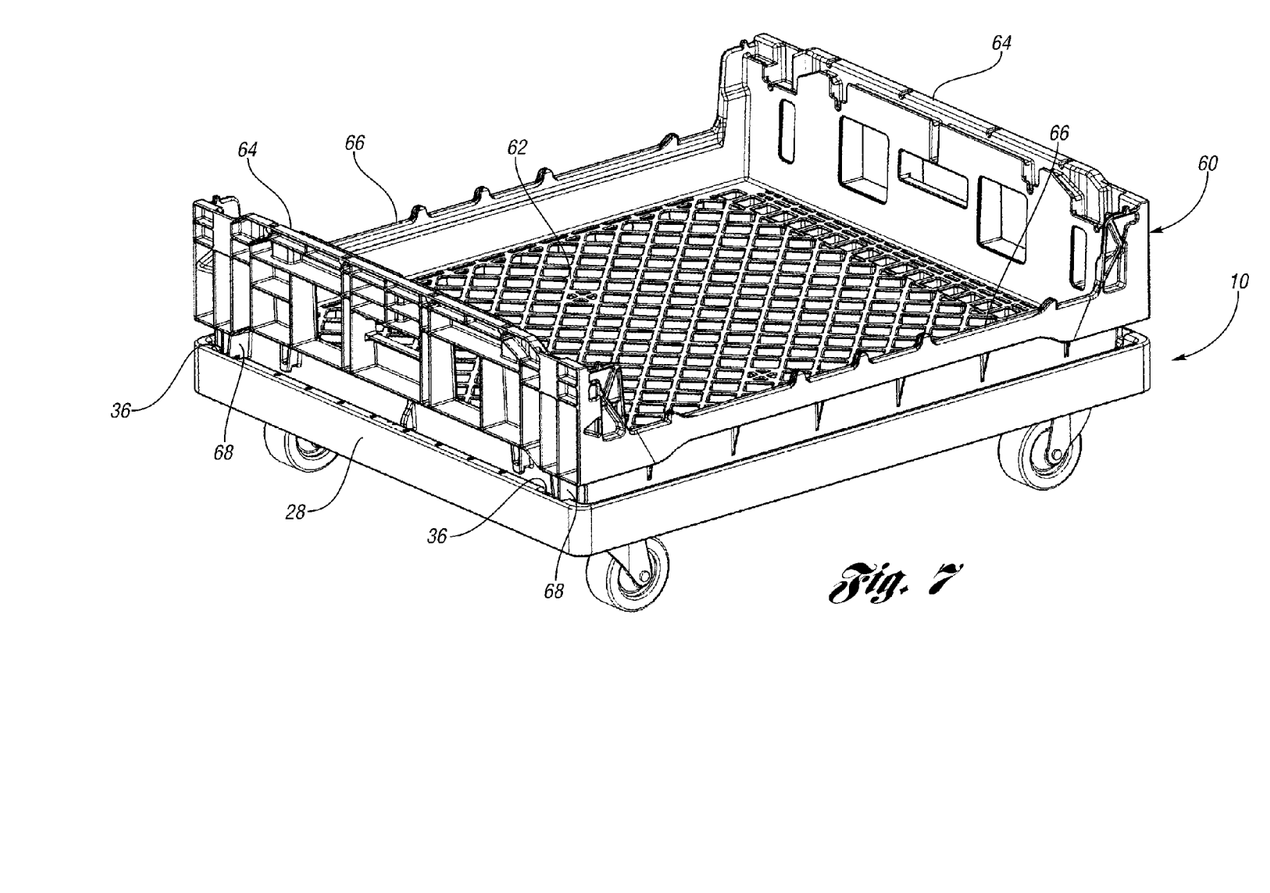
FIG. 7 shows the dolly of FIG. 1 with a second tray stacked thereon.

FIG. 7 shows a second tray 60 stacked on the dolly 10. The second tray 60 also includes a base 62 having side walls 64 and front and rear walls 66 extending upwardly therefrom. The side walls 64 are taller than the front and rear walls 66. Stacking feet 68 protrude outwardly from the side walls 64 and are received in the recesses 36 in the peripheral lip 28. Additional second trays 60 and first trays 50 can be stacked on the second tray 60.

Figure 8:
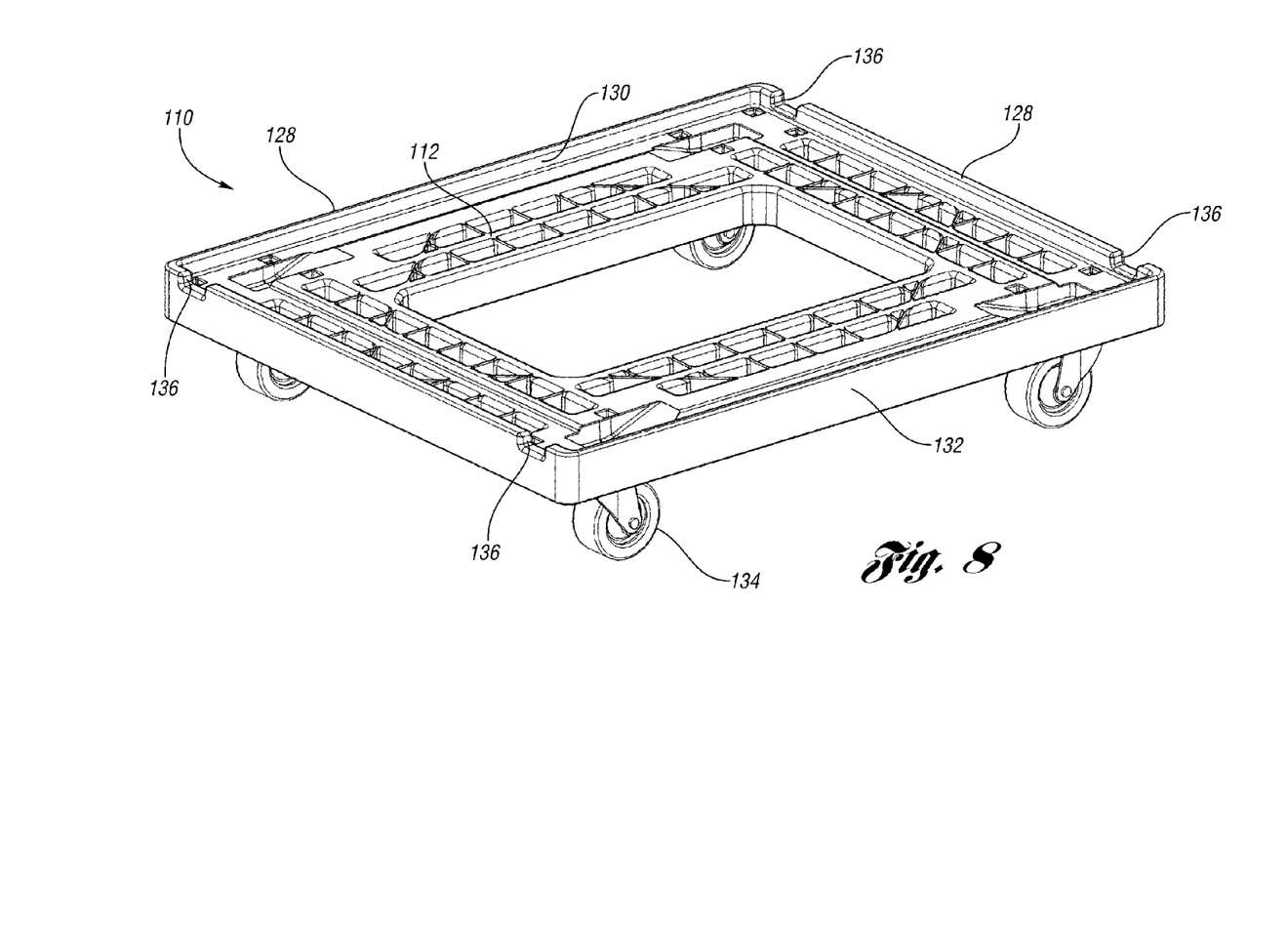
FIG. 8 is a perspective view of a dolly according to a second embodiment of the present invention.
Figure 9:
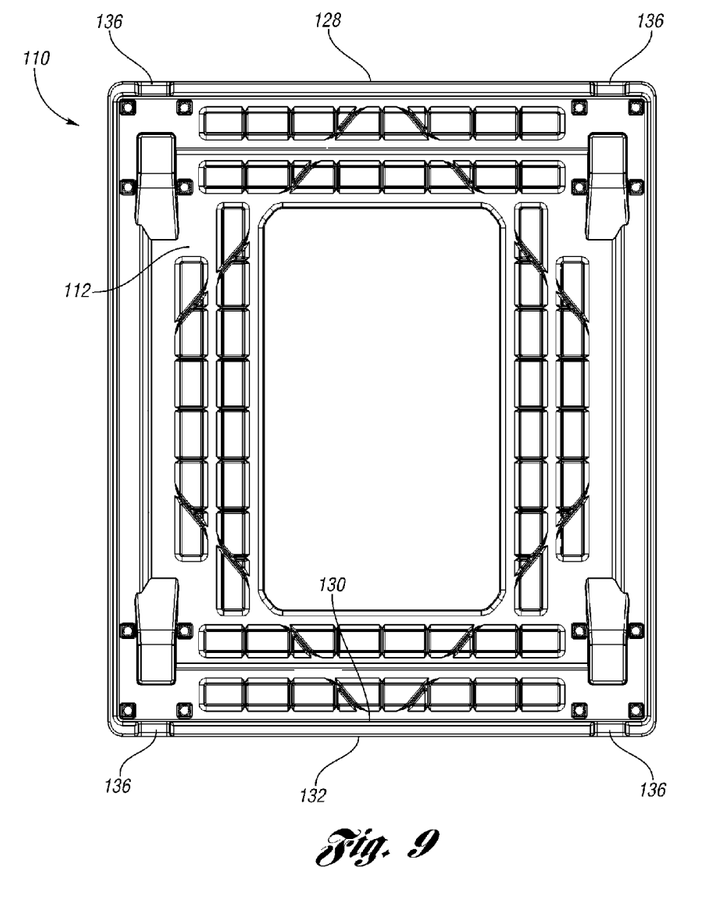
FIG. 9 is a top view of the dolly of FIG. 8.
Figure 10:
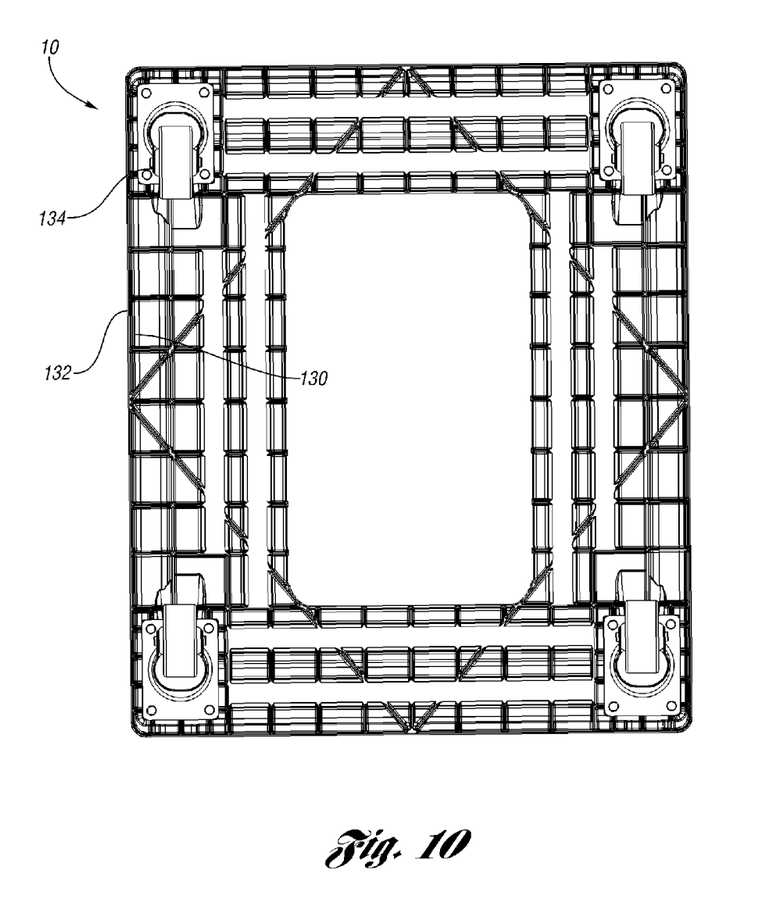
FIG. 10 is a bottom view of the dolly of FIG. 8.
Figure 11:
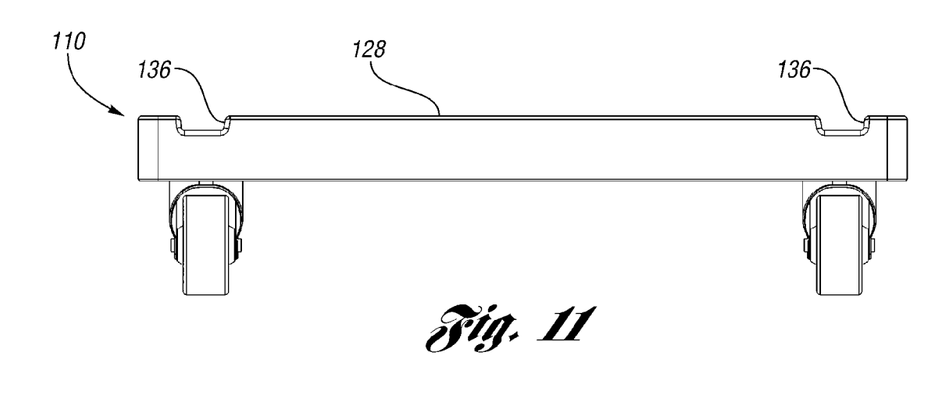
FIG. 11 is an end view of the dolly of FIG. 8.
Figure 12:
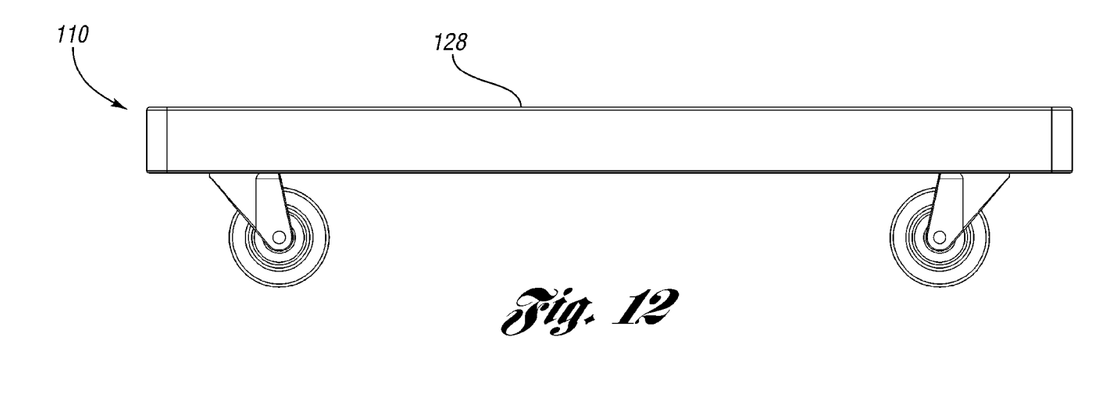
FIG. 12 is a side view of the dolly of FIG. 8.

FIG. 8 illustrates a dolly 110 according to a second embodiment of the present invention. The second dolly 110 is generally identical to the first dolly 10 of FIGS. 1-7 except as otherwise shown or described. The dolly 110 includes a central support surface 112 and a double-walled peripheral lip 128 having an inner wall portion 130 and an outer wall portion 132. Recesses 136 (or notches) are formed through end portions of the peripheral lip 128. The recesses 136 are formed through the inner wall portion 130 and the outer wall portion 132. Casters 134 extend downward from the deck of the dolly 110. FIG. 9 is a top view of the dolly 110. FIG. 10 is a bottom view of the dolly 110. FIG. 11 is an end view of the dolly 110 showing the recesses 136 formed through the end of the peripheral lip 128. FIG. 12 is a side view of the dolly 110.

Figure 12A:
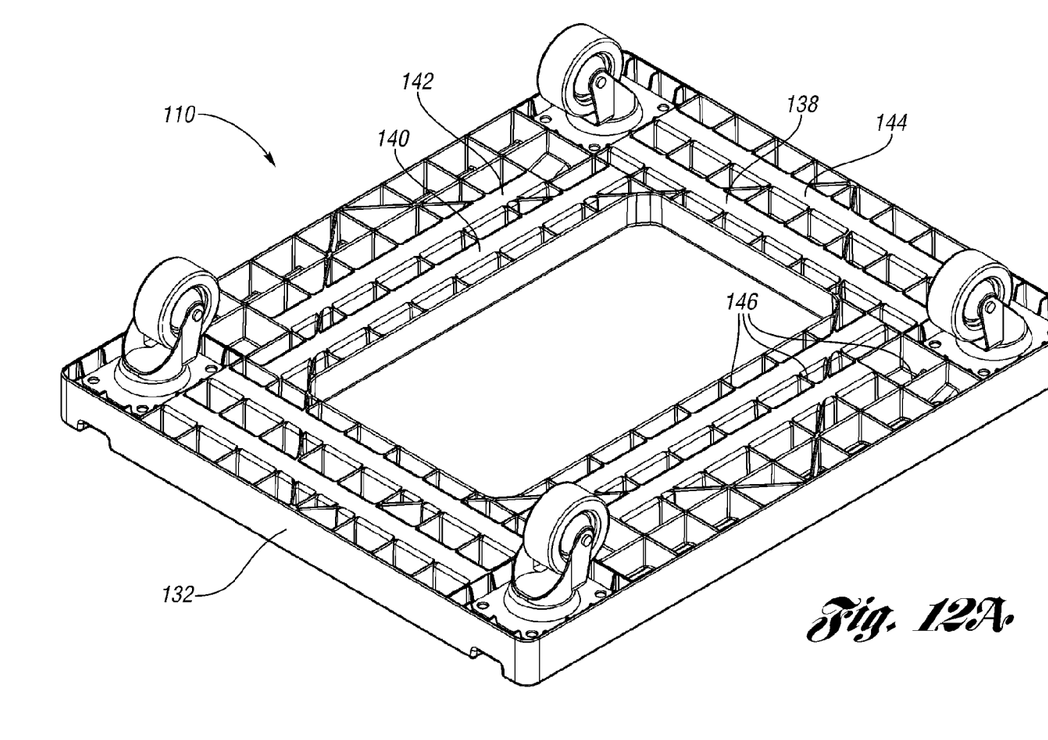
FIG. 12A is a bottom perspective view of the dolly of FIG. 8.

FIG. 12A is a bottom perspective view of the dolly 110. As shown, the channels formed in the upper surface (FIG. 8) are partially defined by at their lower end by lower panels 138, 140, 142, 144. Ribs 146 support the upper horizontal panels and surfaces (FIG. 8) of the deck of the dolly 110.

Figure 13:
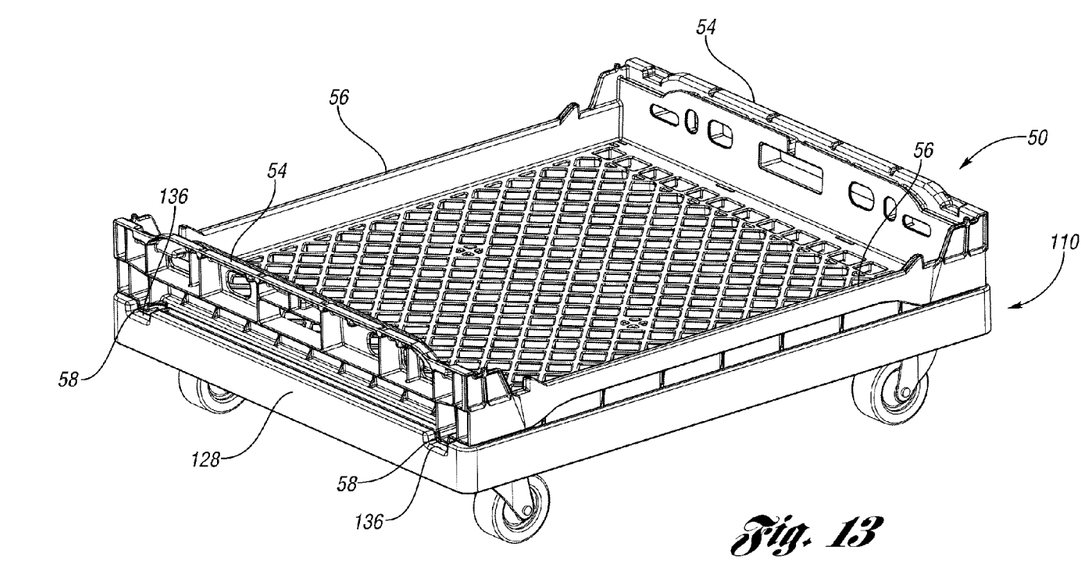
FIG. 13 shows the dolly of FIG. 8 with a first tray stacked thereon.

FIG. 13 shows the dolly 110 with the first tray 50 stacked thereon. The feet 58 of the side walls 54 are received in the recesses 136 in the end portions of the peripheral lip 128.

Figure 14:
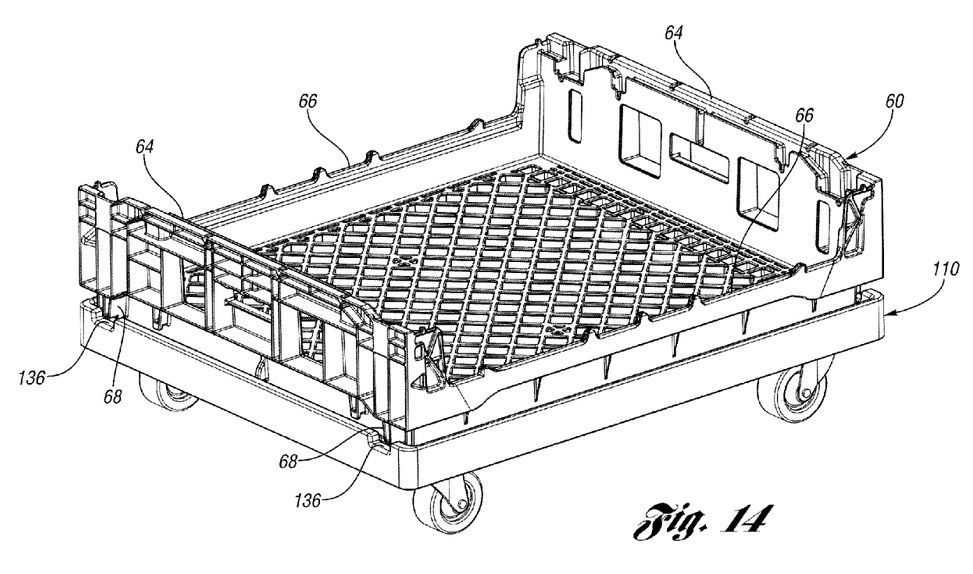
FIG. 14 shows the dolly of FIG. 8 with a second tray stacked thereon.

FIG. 14 shows the second tray 60 stacked on the dolly 110. As shown, the stacking feet 68 of the second tray 60 are received in the recesses 136 of the peripheral lip 128 of the dolly 110.

Figure 15:
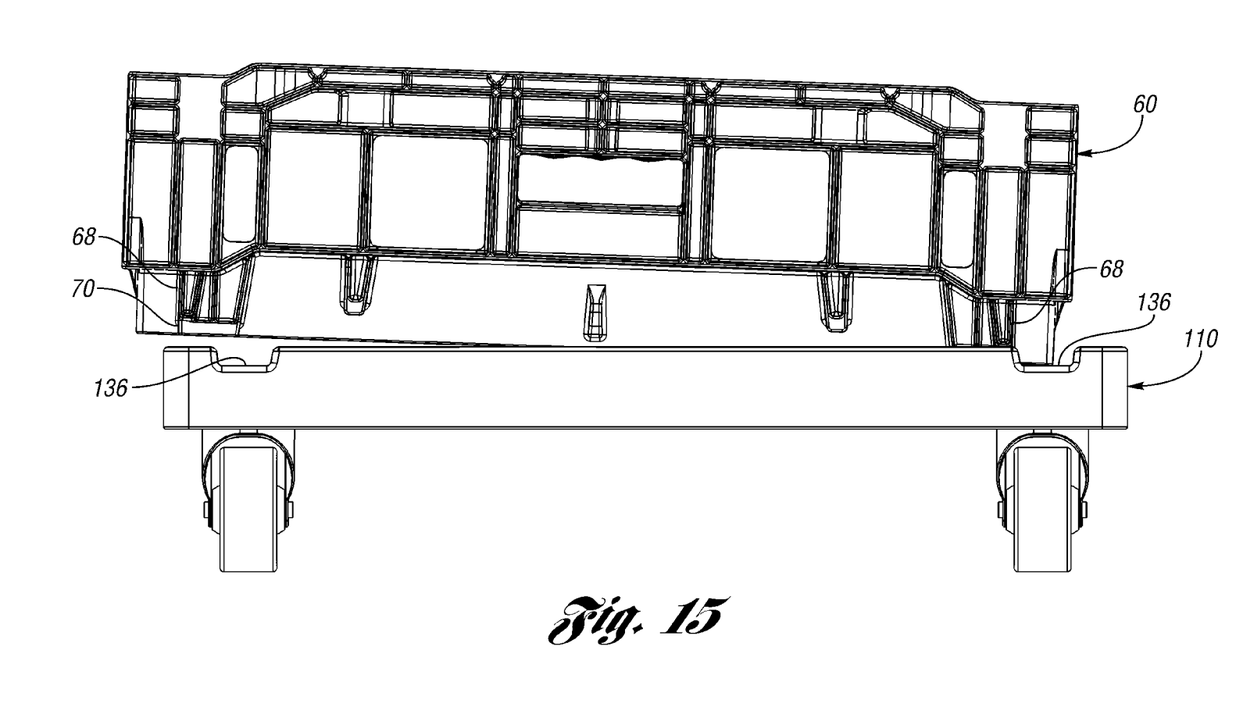
FIG. 15 is an end view of the second tray being slid onto the dolly of FIG. 14.

FIG. 15 is an end view of the dolly 110 as the second tray 60 is being slid into position. One of the feet 68 rests on top of the peripheral lip 128 as shown, both feet 68 on each side wall include a lower flange portion 70 protruding downwardly from the stacking feet 68. The lower flange portion 70 is also recessed inwardly from an outer edge of the stacking feet 68, such that the lower flange portion 70 would contact the inner wall portion 130 of the peripheral lip 128 as the stacking foot 68 rides on top of the peripheral lip 128. This is shown more clearly in FIG. 16.

Figure 16:
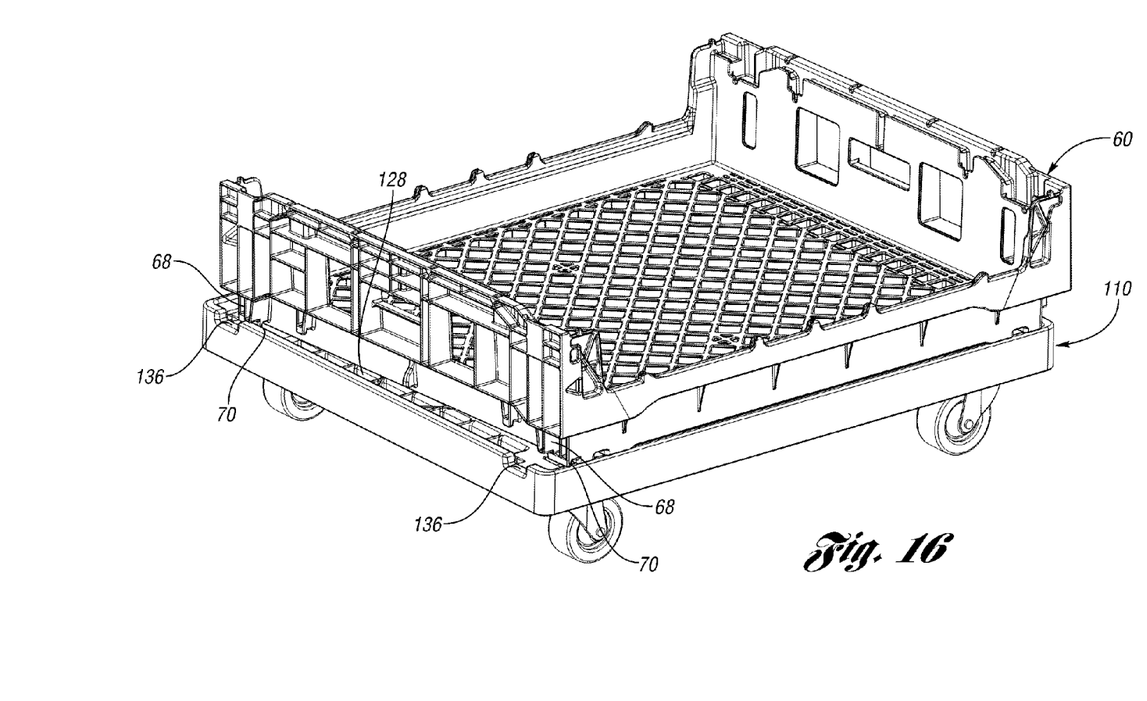
FIG. 16 is a perspective view of the tray and dolly of FIG. 15.

The stacking feet 58 of the first tray 50 include a similar lower flange and would operate similarly on the dolly 110. Further, the first tray 50 and second tray 60 would stack similarly on the first tray 10.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A dolly and tray in combination comprising:
a dolly including a deck having a support surface circumscribing an opening, the support surface including at least one reinforcement channel formed therein, the deck including a peripheral lip around a periphery of the deck, the peripheral lip including an inner wall spaced inwardly from an outer wall, an upper horizontal wall joining the inner wall and the outer wall continuously at upper edges thereof, wherein the peripheral lip includes opposed, generally parallel end portions and opposed, generally parallel side portions and wherein the end portions of the peripheral lip each includes a plurality of recesses formed therein, wherein the deck includes a recessed area outward of the support surface between the support surface and the peripheral lip, wherein the recessed area is lower than the peripheral lip and lower than the support surface, the dolly further including a plurality of wheels below the deck; and
a tray having a base, side walls extending upward from side edges of the base, end walls extending upward from the base, wherein stacking feet protrude outward from the side walls, the tray stacked on the dolly such that the stacking feet are received in the recesses in the peripheral lip.

2. The dolly and tray of claim 1 wherein the recesses are openings through the inner wall and through the outer wall.

3. The dolly and tray of claim 1 wherein the outer wall of the peripheral lip is taller than the inner wall of the peripheral lip.

4. The dolly and tray of claim 3 wherein the outer wall of the peripheral lip extends completely and continuously about the periphery of the deck.

5. A dolly comprising:
a deck having a support surface, the support surface including at least one reinforcement channel formed therein, the deck including a peripheral lip around a periphery of the deck, the peripheral lip including an inner wall spaced inwardly from an outer wall, an upper horizontal wall joining the inner wall and the outer wall continuously at upper edges thereof, wherein the deck includes a recessed area outward of the support surface between the support surface and the peripheral lip, wherein the recessed area is lower than the peripheral lip and lower than the support surface; and a plurality of wheels below the deck, the peripheral lip including end portions and side portions, the end portions of the peripheral lip each including a plurality of recesses formed therein, wherein the recesses are openings through the inner wall, but not through the outer wall, such that the recesses are bounded by the outer wall.

6. The dolly of claim 5 in combination with a tray having a base, side walls extending upward from side edges of the base, end walls extending upward from the base, wherein stacking feet protrude outward from the side walls, the tray stacked on the dolly such that the stacking feet are received in the recesses in the peripheral lip.

7. A dolly and tray in combination comprising:
a dolly including a deck having a support surface, the deck including a peripheral lip, wherein the peripheral lip includes end portions and side portions and wherein the end portions of the peripheral lip each includes a plurality of recesses formed therein, the peripheral lip including an inner wall spaced inwardly from an outer wall, wherein the recesses are openings through the inner wall, but not through the outer wall, such that the recesses are bounded by the outer wall, the inner wall extending upward from an edge of the support surface, the outer wall spaced outward from the edge of the support surface, the dolly further including a plurality of wheels below the deck; and
a tray having a base, side walls extending upward from side edges of the base, end walls extending upward from the base, wherein stacking feet protrude outward from the side walls, the tray stacked on the dolly such that the stacking feet are received in the recesses in the peripheral lip.

8. A dolly and tray in combination comprising:
a dolly including a deck having a support surface, the deck including a peripheral lip around a periphery of the deck, the peripheral lip including an inner wall spaced away from an outer wall to define a void therebetween, the inner wall extending upward from an outer periphery of the support surface, the outer wall extending downward lower than the support surface, the outer wall spaced outward of the inner wall, an upper horizontal wall joining the inner wall and the outer wall continuously at upper edges thereof, wherein the peripheral lip includes end portions and side portions and wherein the end portions of the peripheral lip each includes a plurality of recesses formed therein, the dolly further including a plurality of wheels below the deck; and a tray having a base, side walls extending upward from side edges of the base, end walls extending upward from the base, wherein stacking feet protrude outward from the side walls, the tray stacked on the dolly such that the stacking feet are received in the recesses in the peripheral lip.

9. The dolly and tray of claim 8 wherein the recesses are openings through the inner wall and through the outer wall.

10. The dolly and tray of claim 8 wherein the recesses are openings through the inner wall, but not through the outer wall, such that the recesses are bounded by the outer wall.

11. A dolly and tray in combination:

the dolly including a deck having a support surface, the support surface including at least one reinforcement channel formed therein, the deck including a peripheral lip around a periphery of the deck, the peripheral lip including an inner wall spaced inwardly from an outer wall, an upper horizontal wall joining the inner wall and the outer wall continuously at upper edges thereof, wherein the deck includes a recessed area outward of the support surface between the support surface and the peripheral lip, wherein the recessed area is lower than the peripheral lip and lower than the support surface, a plurality of wheels below the deck; and a tray having a base, side walls extending upward from side edges of the base, end walls extending upward from the base, wherein stacking feet protrude outward from the side walls, the tray stacked on the dolly such that the stacking feet are received in recesses in the peripheral lip.

12. The dolly and tray of claim 11 wherein the outer wall of the peripheral lip extends completely and continuously about the periphery of the deck.

13. The dolly of claim 12 wherein the outer wall of the peripheral lip is taller than the inner wall of the peripheral lip.

14. The dolly and tray of claim 1 wherein the deck is generally rectangular and the peripheral lip has generally parallel opposed end portions.

* * * * *